United States Patent
Zhou (10) Patent No.: US 11,604,567 B2
(45) Date of Patent: Mar. 14, 2023

(54) INFORMATION PROCESSING METHOD AND TERMINAL

(71) Applicant: VIVO MOBILE COMMUNICATION CO., LTD., Guangdong (CN)

(72) Inventor: Feng Zhou, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 17/202,772

(22) Filed: Mar. 16, 2021

(65) Prior Publication Data

US 2021/0200398 A1 Jul. 1, 2021

Related U.S. Application Data

(63) Continuation of application No. PCT/CN2019/097870, filed on Jul. 26, 2019.

(30) Foreign Application Priority Data

Sep. 19, 2018 (CN) .......................... 201811093720.1

(51) Int. Cl.
*G06F 3/0484* (2022.01)
*G06F 3/147* (2006.01)

(52) U.S. Cl.
CPC ............ *G06F 3/0484* (2013.01); *G06F 3/147* (2013.01); *G06F 2203/04803* (2013.01)

(58) Field of Classification Search
CPC .................................................... G06F 3/0484
USPC .......................................... 715/761; 345/1.3
See application file for complete search history.

(56) References Cited

U.S. PATENT DOCUMENTS

| | | | |
|---|---|---|---|
| 9,164,546 B2 * | 10/2015 | Sirpal | G06F 3/1438 |
| 9,904,501 B2 * | 2/2018 | Becze | G06F 3/04817 |
| 2011/0154248 A1 | 6/2011 | Tsuruoka | |
| 2012/0081271 A1 * | 4/2012 | Gimpl | G06F 3/04886 |
| | | | 345/1.3 |
| 2012/0101722 A1 | 4/2012 | Inami et al. | |
| 2013/0076597 A1 * | 3/2013 | Becze | H04M 1/0216 |
| | | | 345/1.3 |

(Continued)

FOREIGN PATENT DOCUMENTS

CN 106027791 A 10/2016
CN 106210277 A 12/2016

(Continued)

OTHER PUBLICATIONS

EP Search Report in Application No. 19863830.6 dated Oct. 20, 2021.

(Continued)

*Primary Examiner* — Ruay Ho
(74) *Attorney, Agent, or Firm* — Maschoff Brennan (57) ABSTRACT

An information processing method and a terminal are provided. The terminal has a first screen and a second screen, and the method includes: in a case that running interfaces of applications are separately displayed on the first screen and the second screen, if a target event is received, displaying, on a target screen, a floating control that is used to indicate the target event; receiving an input for the floating control; and processing the target event in response to the input for the floating control, where the target screen is the first screen or the second screen.

11 Claims, 5 Drawing Sheets

(56) References Cited

U.S. PATENT DOCUMENTS

| | | | |
|---|---|---|---|
| 2013/0076782 A1* | 3/2013 | Sirpal | G06F 1/1643 |
| | | | 345/1.3 |
| 2015/0199125 A1 | 7/2015 | Tsukamoto et al. | |
| 2018/0033406 A1* | 2/2018 | Park | G09G 5/391 |
| 2018/0121056 A1 | 5/2018 | Kyoya et al. | |
| 2018/0121065 A1 | 5/2018 | Seo et al. | |
| 2019/0042066 A1* | 2/2019 | Kim | G06F 1/1649 |
| 2019/0065240 A1* | 2/2019 | Kong | G06F 3/04886 |
| 2019/0273791 A1 | 9/2019 | Feng et al. | |
| 2019/0361576 A1 | 11/2019 | Rui | |
| 2020/0133339 A1* | 4/2020 | Yildiz | G06F 1/1626 |

FOREIGN PATENT DOCUMENTS

| | | |
|---|---|---|
| CN | 107678664 A | 2/2018 |
| CN | 107704177 A | 2/2018 |
| CN | 108012001 A | 5/2018 |
| CN | 108400925 A | 8/2018 |
| CN | 109379484 A | 2/2019 |
| JP | 2011007703 A | 1/2011 |
| JP | 2011134001 A | 7/2011 |
| JP | 2015132965 A | 7/2015 |
| JP | 2018073210 A | 5/2018 |
| KR | 20180057936 A | 5/2018 |
| WO | 2018082483 A1 | 5/2018 |

OTHER PUBLICATIONS

Written Opinion and International Search Report in Application No. PCT/CN2019/097870 dated Apr. 1, 2021.

JP Office Action in Application No. 2021-515017 dated Apr. 19, 2022.

KR Office Action in Application No. 10-2021-7010804 dated Aug. 17, 2022.

* cited by examiner

INFORMATION PROCESSING METHOD AND TERMINAL

CROSS-REFERENCE TO RELATED APPLICATIONS

This application is a continuation application of PCT Application No. PCT/CN2019/097870 filed on Jul. 26, 2019, which claims priority to Chinese Patent Application No. 201811093720.1, filed in China on Sep. 19, 2018, disclosures of which are incorporated herein by reference in their entireties.

TECHNICAL FIELD

The present disclosure relates to the field of communications technologies, and in particular, to an information processing method and a terminal.

RELATED ART

With rapid development of terminal technologies, a dual-screen terminal is already well known to users, and is increasingly welcomed by the users. The dual-screen terminal has a first screen and a second screen (one screen is a main screen), and different applications may run on different screens, to meet diversified requirements of the users. However, in a case that applications run on different screens, if some burst events are received, the burst event directly interrupts an application running on the main screen. Consequently, a manner of processing the burst event by the terminal is relatively single.

SUMMARY

According to a first aspect, an embodiment of the present disclosure provides an information processing method. The method is applied to a terminal having a first screen and a second screen and includes:

in a case that running interfaces of applications are separately displayed on the first screen and the second screen, if a target event is received, displaying, on a target screen, a floating control that is used to indicate the target event;

receiving an input for the floating control; and processing the target event in response to the input for the floating control, where the target screen is the first screen or the second screen.

According to a second aspect, an embodiment of the present disclosure further provides a terminal. The terminal has a first screen and a second screen, and the terminal includes:

a display module, configured to: in a case that running interfaces of applications are separately displayed on the first screen and the second screen, if a target event is received, display, on a target screen, a floating control that is used to indicate the target event;

a receiving module, configured to receive an input for the floating control; and a processing module, configured to process the target event in response to the input for the floating control, where the target screen is the first screen or the second screen.

According to a third aspect, an embodiment of the present disclosure further provides a terminal, including a processor, a memory, and a computer program that is stored in the memory and that can run on the processor. When the computer program is executed by the processor, steps of the foregoing information processing method are implemented.

According to a fourth aspect, an embodiment of the present disclosure further provides a non-transitory computer readable storage medium. The computer readable storage medium stores a computer program, and when the computer program is executed by a processor, steps of the foregoing information processing method are implemented.

BRIEF DESCRIPTION OF DRAWINGS

To describe the technical solutions in the embodiments of the present disclosure more clearly, the following briefly describes the accompanying drawings required in the embodiments of the present disclosure. Apparently, the accompanying drawings in the following descriptions show merely some embodiments of the present disclosure, and a person of ordinary skill in the art may still derive other drawings from these accompanying drawings without creative efforts.

DETAILED DESCRIPTION

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
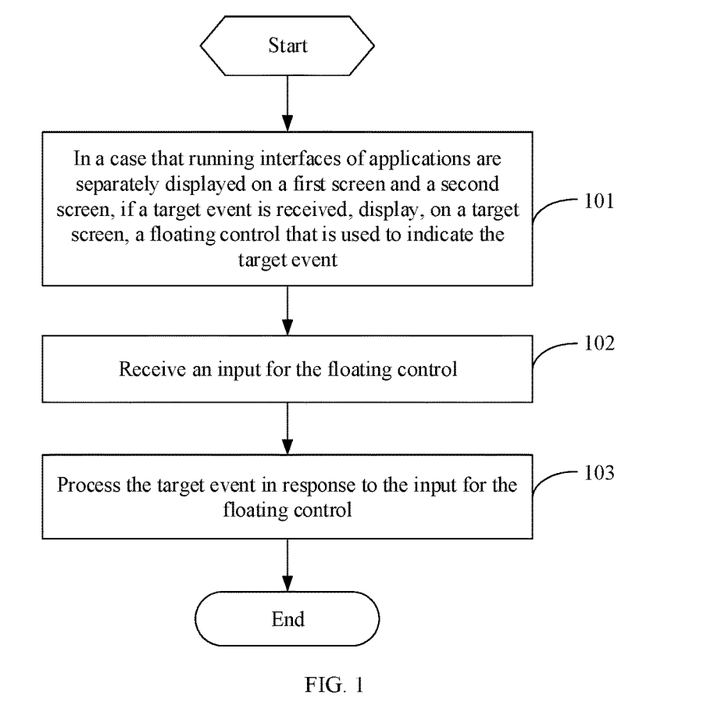
FIG. 1 is a flowchart 1 of an information processing method according to an embodiment of the present disclosure.

Referring to FIG. 1, FIG. 1 is a flowchart of an information processing method according to an embodiment of the present disclosure. The method is applied to a terminal having a first screen and a second screen. As shown in FIG. 1, the method includes the following steps:

Step 101: In a case that running interfaces of applications are separately displayed on the first screen and the second screen, if a target event is received, display, on a target screen, a floating control that is used to indicate the target event.

In this embodiment, applications displayed on the first screen and the second screen may be a same application, or may be different applications. One of the first screen and the second screen may be a main screen and the other is a back screen (namely, a secondary screen).

In this embodiment, the target event may be a burst event such as an incoming call, an alarm clock reminder, a video phone, a low-power reminder, or a calendar reminder. Certainly, in addition, there may also be some burst events that can block current screen display. This is not limited in this embodiment.

In this embodiment, the target screen may be the first screen, or may be the second screen. The floating control may be a floating box, or may be a floating ball, or the like. The floating control may be displayed on the first screen, or may be displayed on the second screen. In addition, when the floating control is displayed on one screen, the floating control may be displayed on the top, the bottom, the left side, or the right side of the screen. Certainly, in addition, the floating control may be displayed in some other locations. This is not limited in this embodiment.

Step 102: Receive an input for the floating control.

In this embodiment, the input for the floating control may be a click input, a double-click input, a slide input, a drag input, or a long press input. Certainly, in addition, there may also be some other inputs. This is not limited in this embodiment.

Step 103: Process the target event in response to the input for the floating control, where the target screen is the first screen or the second screen.

In this embodiment, there may be a plurality of manners of processing the target event in response to the input for the floating control. For example, when a user slides the floating control leftward, the target event may be processed on the first screen. When the user slides the floating control rightward, the target event may be processed on the second screen. When the user slides the floating control upward, the target event may be suspended in a background. It should be noted that when the user does not input the floating control within a preset time period, the target event may also be suspended in the background. Therefore, a currently running application is not affected.

In this way, differential processing may be performed on the target event for different inputs of the floating control. As required, the user may choose to operate the floating control or not operate the floating control, or how to operate the floating control to implement differential processing on the target event, so that a burst event can be processed in a diversified manner.

In this embodiment of the present disclosure, the terminal may be a mobile phone, a tablet computer (Tablet Personal Computer), a laptop computer, a personal digital assistant (PDA), a mobile Internet device (MID), a wearable device, or the like.

According to the information processing method in this embodiment of the present disclosure, in a case that the running interfaces of the applications are separately displayed on the first screen and the second screen, if the target event is received, the floating control that is used to indicate the target event is displayed on the target screen; the input for the floating control is received; and the target event is processed in response to the input for the floating control, where the target screen is the first screen or the second screen. In this way, the target event is processed in response to the input for the floating control, so that a burst event can be processed in a diversified manner.

Figure 2:
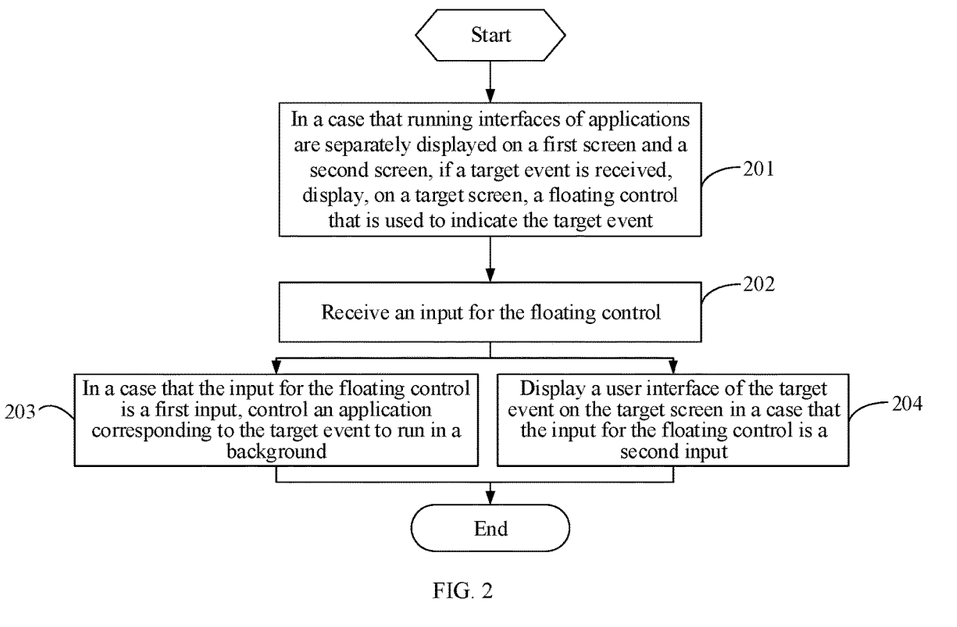
FIG. 2 is a flowchart 2 of an information processing method according to an embodiment of the present disclosure.

Referring to FIG. 2, FIG. 2 is a flowchart of an information processing method according to an embodiment of the present disclosure. The method is applied to a terminal having a first screen and a second screen. A main difference between this embodiment and the foregoing embodiment lies in that in this method, the processing the target event in response to the input for the floating control includes: in a case that the input for the floating control is a first input, controlling an application corresponding to the target event to run in a background; and displaying a user interface of the target event on the target screen in a case that the input for the floating control is a second input. As shown in FIG. 2, the method includes the following steps:

Step 201: In a case that running interfaces of applications are separately displayed on the first screen and the second screen, if a target event is received, display, on a target screen, a floating control that is used to indicate the target event.

In this embodiment, applications displayed on the first screen and the second screen may be a same application, or may be different applications. One of the first screen and the second screen may be a main screen and the other is a back screen (namely, a secondary screen).

In this embodiment, the target event may be a burst event such as an incoming call, an alarm clock reminder, a video phone, a low-power reminder, or a calendar reminder. Certainly, in addition, there may also be some burst events that can block current screen display. This is not limited in this embodiment.

In this embodiment, the target screen may be the first screen, or may be the second screen. The floating control may be a floating box, or may be a floating ball, or the like. The floating control may be displayed on the first screen, or may be displayed on the second screen. In addition, when the floating control is displayed on one screen, the floating control may be displayed on the top, the bottom, the left side, or the right side of the screen. Certainly, in addition, the floating control may be displayed in some other locations. This is not limited in this embodiment.

Step 202: Receive an input for the floating control.

In this embodiment, the input for the floating control may be a click input, a double-click input, a slide input, a drag input, or a long press input. Certainly, in addition, there may also be some other inputs. This is not limited in this embodiment.

Step 203: In a case that the input for the floating control is a first input, control an application corresponding to the target event to run in a background.

In this embodiment, the first input may be an upward sliding input, a downward sliding input, or the like. Certainly, in addition, the first input may also be some other inputs. This is not limited in this embodiment. The controlling an application corresponding to the target event to run in a background is: performing task stacking, and processing the target event after a task of a currently running application is processed Step 204: Display a user interface of the target event on the target screen in a case that the input for the floating control is a second input, where the target screen is the first screen or the second screen.

In this embodiment, the second input may be a leftward sliding input, a rightward sliding input, or the like. Certainly, in addition, the second input may also be some other inputs, and there is a difference between the second input and the first input. The displaying a user interface of the target event on the target screen may be displaying the user interface of the target event on the first screen, or may be displaying the user interface of the target event on the second screen. In addition, the target screen may be a screen randomly selected from the first screen and the second screen, or a secondary screen in the first screen and the second screen, or may be a screen determined based on the second input.

In this way, different processing is performed on the target event based on the first input and the second input, so that the target event can be processed based on a requirement of a user, a processing manner of the target event can be increased, and a proper processing manner can be selected to avoid impact of the target event on an application running on a screen.

Optionally, the displaying a user interface of the target event on the target screen in a case that the input for the floating control is a second input includes:

in a case that the input for the floating control is the second input, displaying the user interface of the target event on the first screen if the second input matches a first target input; and displaying the user interface of the target event on the second screen if the second input matches a second target input.

In this implementation, the first target input may be a leftward sliding input, or may be a leftward sliding input whose sliding speed exceeds a threshold. The second target input may be a rightward sliding input, or may be a rightward sliding input whose sliding speed exceeds a threshold.

Certainly, in addition to the foregoing manner, an identifier may also be displayed on the floating control. The first target input is an input of sliding the identifier leftward, the second target input is an input of sliding the identifier rightward, and the like.

In this implementation, it is determined that the second input matches the first target input or the second target input, so that a corresponding screen is selected to display the user interface of the target event. In this way, the user may select the corresponding screen based on a requirement of the user, and the user interface of the target event may be displayed on one screen without affecting the other screen, thereby facilitating an operation of the user.

Optionally, the floating control includes a first identifier used to indicate the first screen and a second identifier used to indicate the second screen, the first target input is an input for the first identifier, and the second target input is an input for the second identifier.

Figure 3:
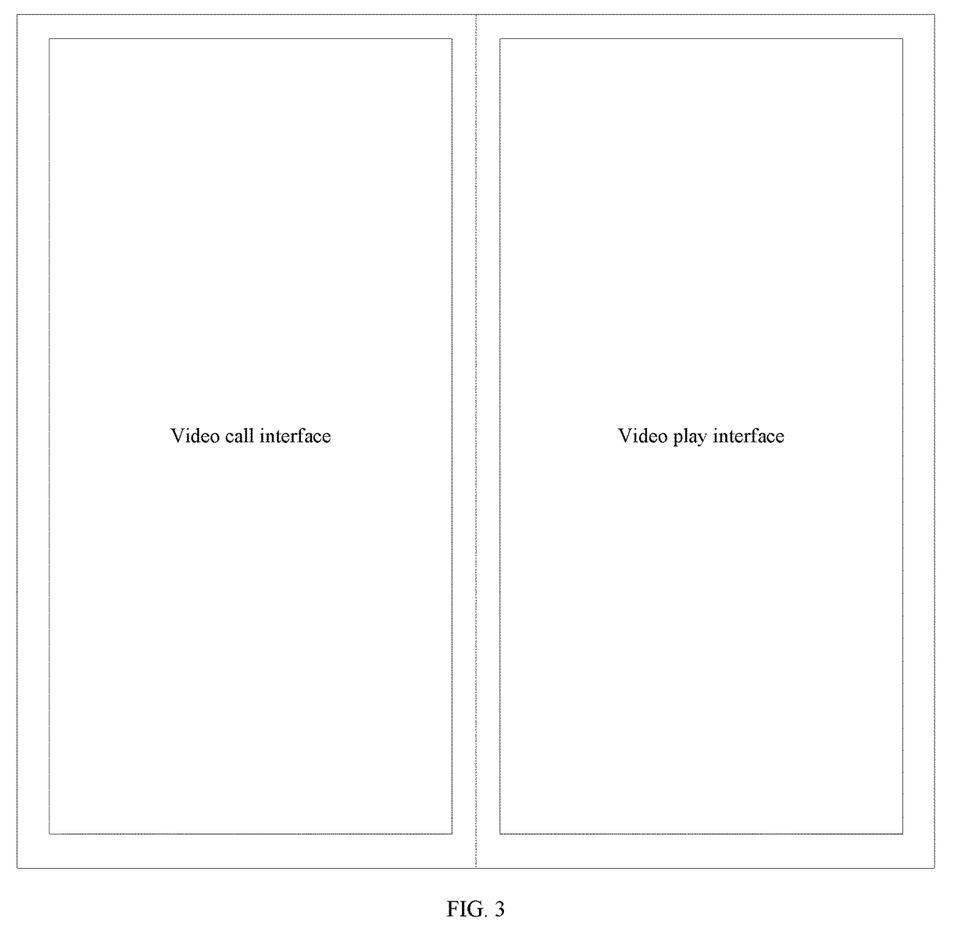
FIG. 3 is a schematic display diagram 1 of a terminal according to an embodiment of the present disclosure.
Figure 4:
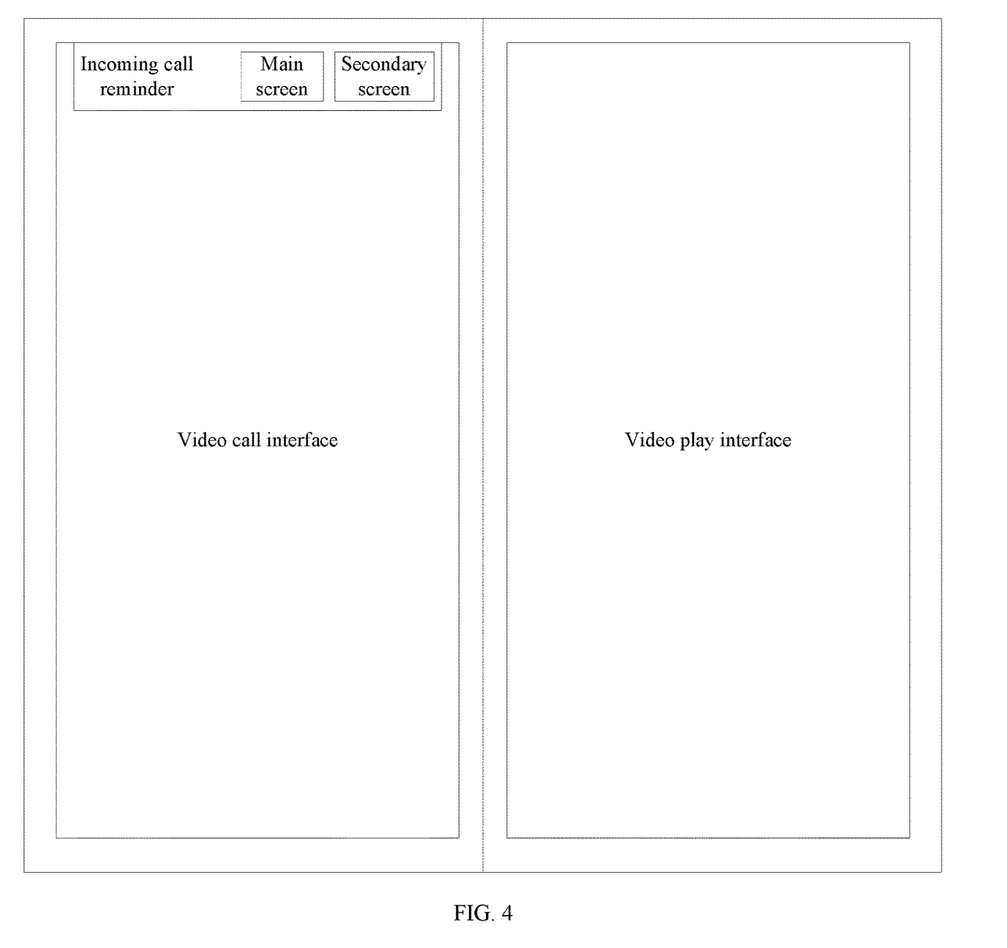
FIG. 4 is a schematic display diagram 2 of a terminal according to an embodiment of the present disclosure.

In this implementation, for better understanding of the foregoing process, refer to FIG. 3 and FIG. 4. FIG. 3 and FIG. 4 are schematic display diagrams of a terminal according to an embodiment of the present disclosure. As shown in FIG. 3, a screen on the left side of the terminal is a first screen, a screen on the right side is a second screen, the screen on the left side may be a main screen, and the screen on the right side may be a secondary screen. The main screen is in a video call and the secondary screen is playing a video. In this case, as shown in FIG. 4 if an incoming call arrives, a floating control may be popped up above the main screen, and a first identifier used to indicate the first screen is displayed on the floating control, that is, an identifier displayed with "main screen", and a second identifier used to indicate the second screen is displayed, that is, an identifier displayed with "secondary screen".

In FIG. 4, when the user touches the first identifier, the user may answer the incoming call on the first screen. When the user touches the second identifier, the user may answer the incoming call on the second screen. In this way, when a burst event occurs, the user is provided with a choice, to avoid interrupting an important application running on the first screen or the second screen, so that the user is free to choose. For example, the user may click to the identifier displayed with "secondary screen", so that the incoming call is received on the second screen, and the video call performed on the first screen is not affected.

Certainly, in addition, an answer mark may be displayed on the floating control. When the user slides leftward for the answer mark, the user may answer the incoming call on the first screen. When the user slides rightward for the answer mark, the user may answer the incoming call on the second screen.

Optionally, running interfaces of different applications are separately displayed on the first screen and the second screen, and the displaying a user interface of the target event on the target screen includes:

obtaining an application whitelist;

detecting whether there is an application that does not belong to the application whitelist running on the first screen and the second screen; and if there is the application that does not belong to the application whitelist, displaying the user interface of the target event on a screen corresponding to the application that does not belong to the application whitelist.

In this implementation, the application whitelist may include some preset applications, such as a first application, a second application, a third application, and a fourth application. The applications included in the application whitelist may be understood as some applications that do not want to be interrupted.

For example, a user interface of the first application may be displayed on the first screen, and a user interface of the fifth application may be displayed on the second screen. In this case, if the target event is received, and the first application is an application in the application whitelist, and the fifth application is not an application in the application whitelist, the user interface of the target event may be displayed on a screen corresponding to the fifth application, namely, the second screen. Therefore, the first application running on the first screen is not affected.

Certainly, if both the application running on the first screen and the application running on the second screen are applications in the application whitelist, the target event may be temporarily suspended in the background, and then the target event is processed after one of the applications exits. If neither the application running on the first screen nor the application running on the second screen is an application in the application whitelist, one screen may be randomly selected to display the user interface of the target event, or one screen may be manually selected by the user to display the user interface of the target event. This is not limited in this embodiment.

In this implementation, some relatively important applications can be effectively prevented from being interrupted by using the application whitelist, thereby ensuring running of the relatively important applications, and also ensuring running fluency of the terminal.

According to the information processing method in this embodiment of the present disclosure, in a case that the running interfaces of the applications are separately displayed on the first screen and the second screen, if the target event is received, the floating control that is used to indicate the target event is displayed on the target screen; the input for the floating control is received; in a case that the input for the floating control is the first input, the application corresponding to the target event is controlled to run in the background; and the user interface of the target event is displayed on the target screen in a case that the input for the floating control is the second input, where the target screen is the first screen or the second screen. In this way, different processing is performed on the target event based on the first input and the second input, so that the target event can be processed based on a requirement of a user, a processing manner of the target event can be increased, and a proper processing manner can be selected to avoid impact of the target event on an application running on a screen.

Figure 5:
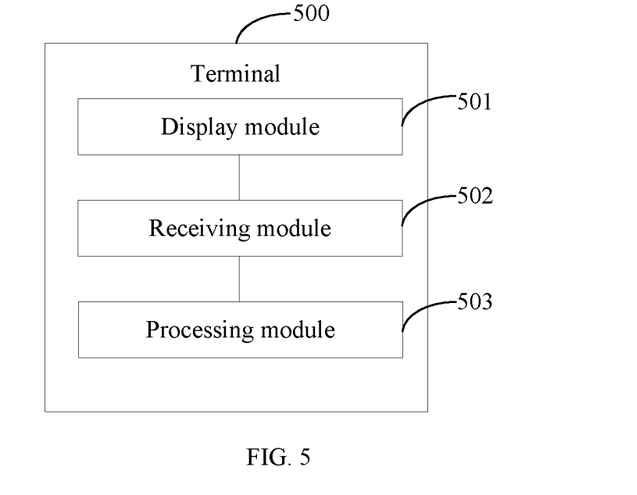
FIG. 5 is a structural diagram 1 of a terminal according to an embodiment of the present disclosure.

Referring to FIG. 5, FIG. 5 is a structural diagram of a terminal according to an embodiment of the present disclosure. The terminal has a first screen and a second screen, and the terminal can implement details of the information processing method in the foregoing embodiment, and achieve a same effect. As shown in FIG. 5, a terminal 500 includes a display module 501, a receiving module 502, and a processing module 503. The display module 501 is connected to the receiving module 502, and the receiving module 502 is connected to the processing module 503.

The display module 501 is configured to: in a case that running interfaces of applications are separately displayed on the first screen and the second screen, if a target event is received, display, on a target screen, a floating control that is used to indicate the target event.

The receiving module 502 is configured to receive an input for the floating control.

The processing module 503 is configured to process the target event in response to the input for the floating control.

The target screen is the first screen or the second screen.

Figure 6:
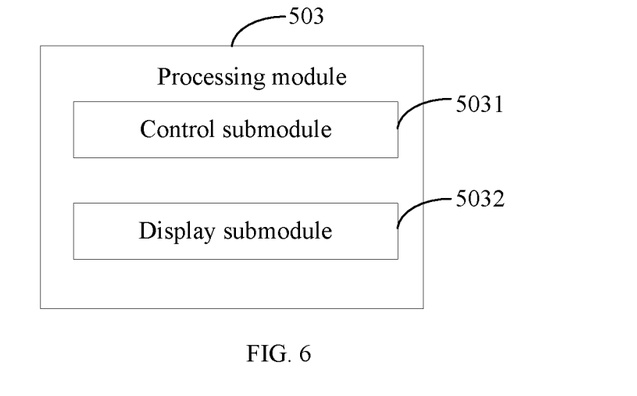
FIG. 6 is a structural diagram of a processing module of a terminal according to an embodiment of the present disclosure.

Optionally, as shown in FIG. 6, the processing module 503 includes:

a control submodule 5031, configured to: in a case that the input for the floating control is a first input, control an application corresponding to the target event to run in a background; and a display submodule 5032, configured to display a user interface of the target event on the target screen in a case that the input for the floating control is a second input.

Figure 7:
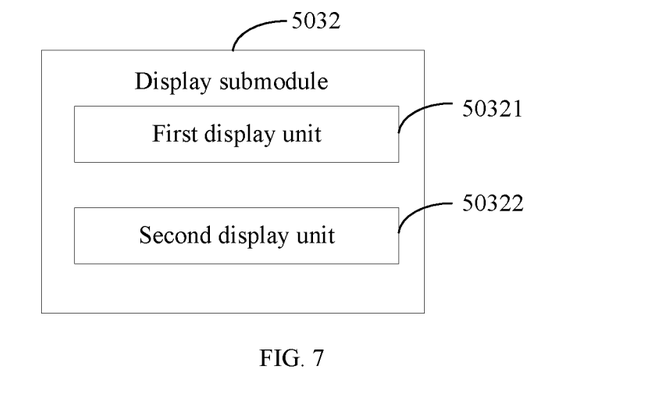
FIG. 7 is a structural diagram 1 of a display submodule of a terminal according to an embodiment of the present disclosure.

Optionally, as shown in FIG. 7, the display submodule 5032 includes:

a first display unit 50321, configured to: in a case that the input for the floating control is the second input, display the user interface of the target event on the first screen if the second input matches a first target input; and a second display unit 50322, configured to display the user interface of the target event on the second screen if the second input matches a second target input.

Optionally, the floating control includes a first identifier used to indicate the first screen and a second identifier used to indicate the second screen, the first target input is an input for the first identifier, and the second target input is an input for the second identifier.

Figures 8, 9:
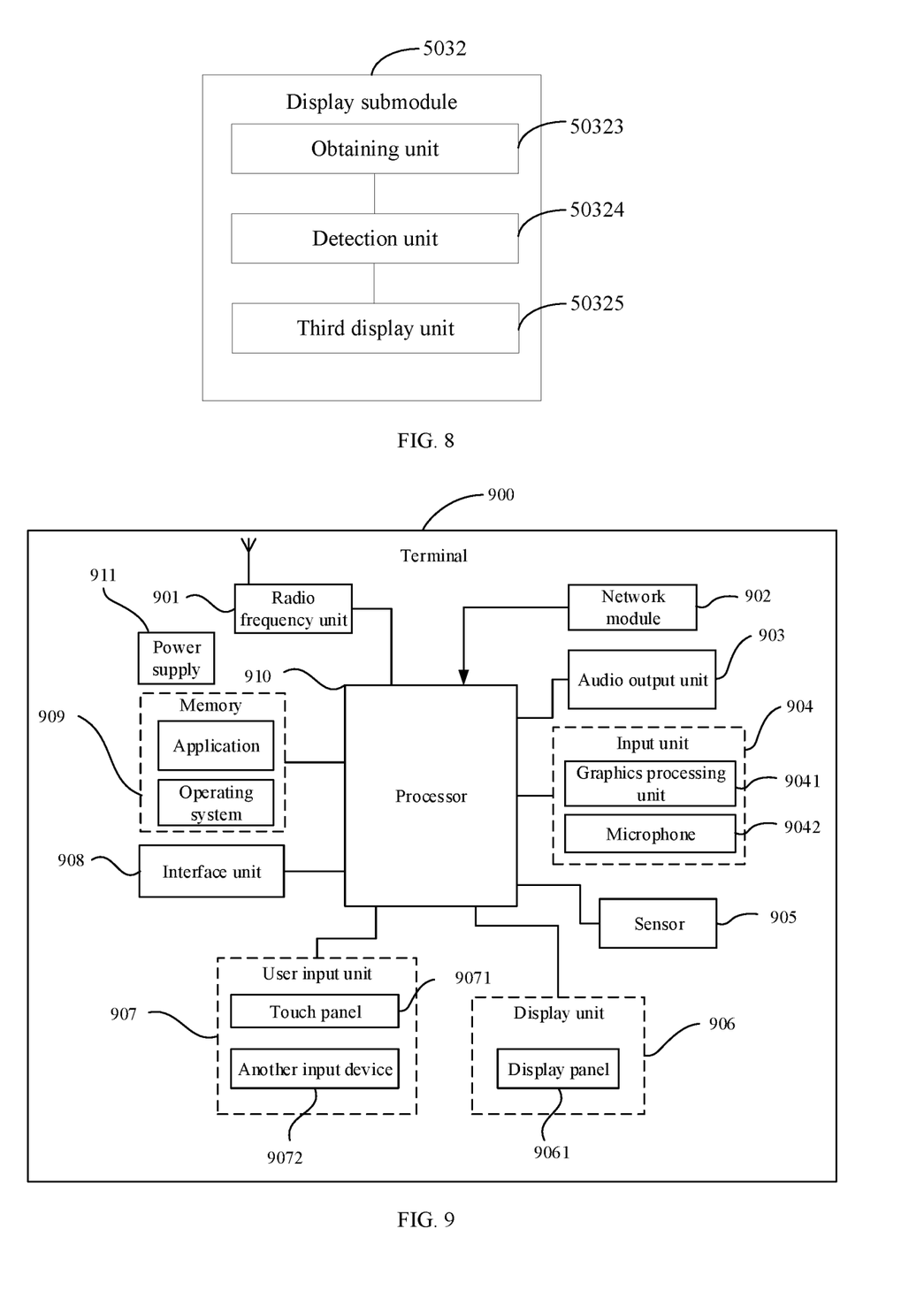
FIG. 8 is a structural diagram 2 of a display submodule of a terminal according to an embodiment of the present disclosure.
FIG. 9 is a structural diagram 2 of a terminal according to an embodiment of the present disclosure.

Optionally, running interfaces of different applications are separately displayed on the first screen and the second screen. As shown in FIG. 8, the display submodule 5032 includes:

an obtaining unit 50323, configured to obtain an application whitelist;

a detection unit 50324, configured to detect whether there is an application that does not belong to the application whitelist running on the first screen and the second screen; and a third display unit 50325, configured to: if the detection unit 50324 detects that there is the application that does not belong to the application whitelist, display the user interface of the target event on a screen corresponding to the application that does not belong to the application whitelist The terminal 500 can implement the processes implemented by the terminal in the foregoing method embodiments in FIG. 1 to FIG. 4. To avoid repetition, details are not described herein again.

According to the terminal 500 in this embodiment of the present disclosure, in a case that the running interfaces of the applications are separately displayed on the first screen and the second screen, if the target event is received, the floating control that is used to indicate the target event is displayed on the target screen; the input for the floating control is received; and the target event is processed in response to the input for the floating control, where the target screen is the first screen or the second screen. In this way, the target event is processed in response to the input for the floating control, so that a burst event can be processed in a diversified manner.

Referring to FIG. 9, FIG. 9 is a schematic diagram of a hardware structure of a terminal according to the embodiments of the present disclosure. The terminal has a first screen and a second screen. The terminal 900 includes but is not limited to components such as a radio frequency unit 901, a network module 902, an audio output unit 903, an input unit 904, a sensor 905, a display unit 906, a user input unit 907, an interface unit 908, a memory 909, a processor 910, and a power supply 911. It may be understood by persons skilled in the art that, the terminal structure shown in FIG. 9 does not constitute any limitation on the terminal, and the terminal may include more or fewer components than those shown in the figure, or combine some components, or have different component arrangements. In this embodiment of the present disclosure, the terminal includes, but is not limited to, a mobile phone, a tablet computer, a notebook computer, a palmtop computer, a vehicle-mounted terminal, a wearable device, a pedometer, or the like.

The processor 910 is configured to: in a case that running interfaces of applications are separately displayed on the first screen and the second screen, if a target event is received, control the display unit 906 to display, on a target screen, a floating control that is used to indicate the target event; control the user input unit 907 to receive an input for the floating control; and process the target event in response to the input for the floating control, where the target screen is the first screen or the second screen.

Optionally, the processor 910 is further configured to: in a case that the input for the floating control is a first input, control an application corresponding to the target event to run in a background; and control the display unit 906 to display a user interface of the target event on the target screen in a case that the input for the floating control is a second input.

Optionally, the processor 910 is further configured to: in a case that the input for the floating control is the second input, control the display unit 906 to display the user interface of the target event on the first screen if the second input matches a first target input; and display the user interface of the target event on the second screen if the second input matches a second target input Optionally, the floating control includes a first identifier used to indicate the first screen and a second identifier used to indicate the second screen, the first target input is an input for the first identifier, and the second target input is an input for the second identifier.

Optionally, running interfaces of different applications are separately displayed on the first screen and the second screen. The processor 910 is further configured to: obtain an application whitelist; detect whether there is an application that does not belong to the application whitelist running on the first screen and the second screen; and if there is the application that does not belong to the application whitelist, control the display unit 906 to display the user interface of the target event on a screen corresponding to the application that does not belong to the application whitelist.

It should be understood that, in some embodiments of the present disclosure, the radio frequency unit 901 may be configured to receive and send information or receive and send a signal in a call process. Specifically, after receiving downlink data from a base station, the radio frequency unit 901 sends the downlink data to the processor 910 for processing. In addition, the radio frequency unit 901 sends uplink data to the base station. Generally, the radio frequency unit 901 includes, but is not limited to, an antenna, at least one amplifier, a transceiver, a coupler, a low noise amplifier, a duplexer, and the like. In addition, the radio frequency unit 901 may communicate with a network and another device through a wireless communication system.

The terminal provides wireless broadband Internet access for a user by using the network module 902, for example, helping the user send and receive an email, browse a web page, and access streaming media.

The audio output unit 903 may convert audio data received by the radio frequency unit 901 or the network module 902 or stored in the memory 909 into an audio signal and output the audio signal as a sound. In addition, the audio output unit 903 may further provide audio output (for example, a call signal received voice, or a message received voice) related to a specific function executed by the terminal 900. The audio output unit 903 includes a speaker, a buzzer, a receiver, and the like.

The input unit 904 is configured to receive an audio signal or a video signal. The input unit 904 may include a graphics processing unit (GPU) 9041 and a microphone 9042. The graphics processing unit 9041 processes image data of a static picture or a video obtained by an image capture apparatus (such as a camera) in a video capture mode or an image capture mode. A processed image frame may be displayed on the display unit 906. The image frame processed by the graphics processing unit 9041 may be stored in the memory 909 (or another storage medium) or sent by using the radio frequency unit 901 or the network module 902. The microphone 9042 may receive a sound and can process such sound into audio data. The audio data obtained through processing may be converted, in a telephone call mode, into a format that can be sent to a mobile communications base station via the radio frequency unit 901 for output.

The terminal 900 further includes at least one type of sensor 905, such as a light sensor, a motion sensor, and another sensor. Specifically, the light sensor includes an ambient light sensor and a proximity sensor, where the ambient light sensor can adjust brightness of the display panel 9061 based on brightness of ambient light, and the proximity sensor can turn off the display panel 9061 and/or backlight when the terminal 900 moves towards the ear. As a type of the motion sensor, an accelerometer sensor may detect an acceleration value in each direction (generally, three axes), and detect a value and a direction of gravity when the accelerometer sensor is static, and may be used in an application for recognizing a terminal posture (such as screen switching between landscape and portrait modes, a related game, or magnetometer posture calibration), a function related to vibration recognition (such as a pedometer or a knock), and the like. The sensor 905 may further include a fingerprint sensor, a pressure sensor, an iris sensor, a molecular sensor, a gyroscope, a barometer, a hygrometer, a thermometer, an infrared sensor, and the like. Details are not described herein.

The display unit 906 is configured to display information entered by a user or information provided for a user. The display unit 906 may include the display panel 9061. The display panel 9061 may be configured in a form of a liquid crystal display (LCD), an organic light-emitting diode (OLED), or the like.

The user input unit 907 may be configured to receive input numeral or character information, and generate key signal input related to user setting and function control of the terminal. Specifically, the user input unit 907 includes a touch panel 9071 and another input device 9072. The touch panel 9071 is also referred to as a touchscreen, and may collect a touch operation performed by a user on or near the touch panel 9071 (such as an operation performed by a user on the touch panel 9071 or near the touch panel 9071 by using any proper object or accessory, such as a finger or a stylus). The touch panel 9071 may include two parts: a touch detection apparatus and a touch controller. The touch detection apparatus detects a touch position of a user, detects a signal brought by a touch operation, and transmits the signal to the touch controller. The touch controller receives touch information from the touch detection apparatus, converts the touch information into contact coordinates, sends the contact coordinates to the processor 910, and receives and executes a command from the processor 910. In addition, the touch panel 9071 may be implemented by using a plurality of types such as a resistive type, a capacitive type, an infrared ray, and a surface acoustic wave. The user input unit 907 may include the another input device 9072 in addition to the touch panel 9071. Specifically, the another input device 9072 may include, but is not limited to, a physical keyboard, function keys (such as a volume control key and a switch key), a trackball, a mouse, and a joystick. Details are not described herein.

Further, the touch panel 9071 can cover the display panel 9061. When detecting a touch operation on or near the touch panel 9071, the touch panel 9071 transmits the touch operation to the processor 910 to determine a type of a touch event. Then, the processor 910 provides corresponding visual output on the display panel 9061 based on the type of the touch event. In FIG. 9, the touch panel 9071 and the display panel 9061 are used as two independent components to implement input and output functions of the terminal. However, in some embodiments, the touch panel 9071 and the display panel 9061 may be integrated to implement the input and output functions of the terminal. This is not specifically limited herein.

The interface unit 908 is an interface connecting an external apparatus to the terminal 900. For example, the external apparatus may include a wired or wireless headphone port, an external power supply (or a battery charger) port, a wired or wireless data port, a storage card port, a port used to connect to an apparatus having an identification module, an audio input/output (I/O) port, a video I/O port, and a headset port. The interface unit 908 may be configured to receive an input (for example, data information and power) from an external apparatus and transmit the received input to one or more elements within the terminal 900, or may be configured to transmit data between the terminal 900 and the external apparatus.

The memory 909 may be configured to store software programs and various data. The memory 909 may mainly include a program storage area and a data storage area. The program storage area may store an operating system, an application required by at least one function (such as a sound play function or an image play function), and the like. The data storage area may store data (such as audio data or an address book) created based on use of the mobile phone, and the like. In addition, the memory 909 may include a high-speed random access memory, and may further include a non-volatile memory, such as at least one magnetic disk storage device, a flash memory device, or another volatile solid-state storage device.

The processor 910 is a control center of the terminal, and connects all parts of the entire terminal by using various interfaces and lines. By running or executing a software program and/or a module stored in the memory 909 and invoking data stored in the memory 909, the processor 910 performs various functions of the terminal and data processing, to perform overall monitoring on the terminal. The processor 910 can include one or more processing units. Preferably, the processor 910 can be integrated with an application processor and a modem processor. The application processor mainly processes the operating system, the user interface, applications, etc. The modem processor mainly processes wireless communication. It may be understood that alternatively, the modem processor may not be integrated into the processor 910.

The terminal 900 may further include the power supply 911 (such as a battery) that supplies power to each component. Preferably, the power supply 911 may be logically connected to the processor 910 by using a power management system, so as to implement functions such as charging, discharging, and power consumption management by using the power management system.

In addition, the terminal 900 includes some function modules that are not shown. Details are not described herein.

Preferably, an embodiment of the present disclosure further provides a terminal, including a processor 910, a memory 909, and a computer program that is stored in the memory 909 and that can run on the processor 910. When the computer program is executed by the processor 910, processes of the foregoing information processing method embodiment are implemented, and a same technical effect can be achieved. To avoid repetition, details are not described herein again.

An embodiment of the present disclosure further provides a computer readable storage medium. The computer readable storage medium stores a computer program. When the computer program is executed by a processor, processes of the foregoing information processing method embodiment are implemented, and a same technical effect can be achieved. To avoid repetition, details are not described herein again. The computer readable storage medium is, for example, a read-only memory (ROM), a random access memory (RAM), a magnetic disk, or an optical disc.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element preceded by "includes a . . . " does not, without more constraints, preclude the presence of additional identical elements in the process, method, article, or apparatus that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of the present disclosure essentially or the part contributing to the related art may be implemented in a form of a software product. The computer software product is stored in a storage medium (for example, a ROM/RAM, a floppy disk, or an optical disc), and includes several instructions for instructing a terminal (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the above specific implementations, and the above specific implementations are merely illustrative but not restrictive. Under the enlightenment of the present disclosure, a person of ordinary skill in the art can make many forms without departing from the purpose of the present disclosure and the protection scope of the claims, all of which fall within the protection of the present disclosure.

What is claimed is:

1. An information processing method, performed by a terminal having a first screen, a second screen and a processor, comprising:
   in a case that running interfaces of applications are separately displayed on the first screen and the second screen, if a target event is received, displaying, by a target screen, a floating control that is used to indicate the target event;
   receiving, by the processor, an input for the floating control obtained by the target screen; and
   processing, by the processor, the target event in response to the input for the floating control, wherein
   the target screen is the first screen or the second screen;
   wherein the processing, by the processor, the target event in response to the input for the floating control comprises:
   in accordance with a determination that the input for the floating control is a second type of input, causing the target screen to display a user interface of the target event;
   wherein running interfaces of different applications are separately displayed on the first screen and the second screen, and the causing the target screen to display a user interface of the target event comprises:
   obtaining an application whitelist, wherein the application whitelist comprises one or more applications that do not want to be interrupted by the target event;
   detecting whether there is an application that does not belong to the application whitelist running on the first screen and the second screen; and
   in accordance with a determination that there is an application that does not belong to the application whitelist running on the first screen and there is an application that belong to the application whitelist running on the second screen, causing the first screen to display the user interface of the target event; and
   in accordance with a determination that there is an application that does not belong to the application whitelist running on the second screen and there is an application that belong to the application whitelist running on the first screen, causing the second screen to display the user interface of the target event.

2. The information processing method according to claim 1, wherein the processing, by the processor, the target event in response to the input for the floating control further comprises:
in accordance with a determination that the input for the floating control is a first type of input, controlling an application corresponding to the target event to run in a background, wherein the first type of input is different from the second type of input.

3. The information processing method according to claim 1, wherein the causing the target screen to display a user interface of the target event comprises:
in accordance with a determination that the input for the floating control is the second type of input indicating that the user interface of the target event is to be displayed and that the input for the floating control is also a third type of input indicating that the target screen is the first screen, causing the first screen to display the user interface of the target event; and
in accordance with a determination that the input for the floating control is the second type of input and that the input for the floating control is also a fourth type of input indicating that the target screen is the second screen, causing the second display screen to display the user interface of the target event.

4. The information processing method according to claim 3, wherein the floating control comprises a first identifier used to indicate the first screen and a second identifier used to indicate the second screen, the first target input is an input for the first identifier, and the second target input is an input for the second identifier.

5. The information processing method according to claim 1, the displaying a user interface of the target event on the target screen further comprises:
in accordance with a determination that there is a first application that belong to the application whitelist running on the first screen and there is a second application that belong to the application whitelist running on the second screen, controlling the user interface of the target event to run in a background, such that the user interface of the target event is suspended from being displayed on the first screen or the second screen until the first application or the second application does not run.

6. A terminal having a first screen and a second screen, comprising a processor, a memory, and a computer program stored in the memory and executable by the processor, wherein when the computer program is executed by the processor, an information processing method is implemented, and the information processing method comprises:
in a case that running interfaces of applications are separately displayed on the first screen and the second screen, if a target event is received, displaying, by a target screen, a floating control that is used to indicate the target event;
receiving, by the processor, an input for the floating control obtained by the target screen; and
processing, by the processor, the target event in response to the input for the floating control, wherein
the target screen is the first screen or the second screen;
wherein the processing, by the processor, the target event in response to the input for the floating control comprises:
in accordance with a determination that the input for the floating control is a second type of input, causing the target screen to display a user interface of the target event;
wherein running interfaces of different applications are separately displayed on the first screen and the second screen, and the causing the target screen to display a user interface of the target event comprises:
obtaining an application whitelist, wherein the application whitelist comprises one or more applications that do not want to be interrupted by the target event;
detecting whether there is an application that does not belong to the application whitelist running on the first screen and the second screen; and
in accordance with a determination that there is an application that does not belong to the application whitelist running on the first screen and there is an application that belong to the application whitelist running on the second screen, causing the first screen to display a user interface of the target event; and
in accordance with a determination that there is an application that does not belong to the application whitelist running on the second screen and there is an application that belong to the application whitelist running on the first screen, causing the second screen to display the user interface of the target event.

7. The terminal according to claim 6, wherein the processing, by the processor, the target event in response to the input for the floating control further comprises:
in accordance with a determination that the input for the floating control is a first type of input, controlling an application corresponding to the target event to run in a background wherein the first type of input is different from the second type of input.

8. The terminal according to claim 7, wherein the causing the target screen to display a user interface of the target event comprises:
in accordance with a determination that the input for the floating control is the second type of input indicating that the user interface of the target event is to be displayed and that the input for the floating control is also a third type of input indicating that the target screen is the first screen, causing the first screen to display the user interface of the target event; and
in accordance with a determination that the input for the floating control is the second type of input and that the input for the floating control is also a fourth type of input indicating that the target screen is the second screen, causing the second display screen to display the user interface of the target event.

9. The terminal according to claim 8, wherein the floating control comprises a first identifier used to indicate the first screen and a second identifier used to indicate the second screen, the first target input is an input for the first identifier, and the second target input is an input for the second identifier.

10. The terminal according to claim 6, the displaying a user interface of the target event on the target screen further comprises:
in accordance with a determination that there is a first application that belong to the application whitelist running on the first screen and there is a second application that belong to the application whitelist running on the second screen, controlling the user interface of the target event to run in a background, such that the user interface of the target event is suspended from being displayed on the first screen or the second screen until the first application or the second application does not run.

11. A non-transitory computer readable medium, wherein the non-transitory computer readable medium stores a computer program, and when the computer program is executed by a processor, steps of the information processing method according to claim 1 are implemented.

\* \* \* \* \*